(12) United States Patent
Eidson

(10) Patent No.: US 6,370,159 B1
(45) Date of Patent: Apr. 9, 2002

(54) SYSTEM APPLICATION TECHNIQUES USING TIME SYNCHRONIZATION

(75) Inventor: John C. Eidson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/120,402

(22) Filed: Jul. 22, 1998

(51) Int. Cl.[7] .................................................. H04J 3/06
(52) U.S. Cl. ...................................... 370/503; 370/507
(58) Field of Search ................................. 370/503, 507

(56) References Cited

U.S. PATENT DOCUMENTS

| | | |
|---|---|---|
| 4,890,222 A | 12/1989 | Kirk |
| 5,384,563 A | 1/1995 | Massey |
| 5,566,180 A * | 10/1996 | Eidson et al. ............... 370/94.2 |
| 6,160,819 A * | 12/2000 | Partridge et al. ........... 370/474 |
| 6,236,623 B1 * | 5/2001 | Read et al. .................... 368/46 |

OTHER PUBLICATIONS

Kopetz, Hermann et al. "Clock Synchronization in Distributed Real–Time Systems" IEEE Transactions on COmputers, vol. C–36, No. 8, Aug. 1987, pp. 933–940.

* cited by examiner

*Primary Examiner*—Melvin Marcelo

(57) ABSTRACT

A method and apparatus for accurately distributing traceable time values to a set of nodes in a system. Each node includes a slave clock that synchronizes a slave time value using a synchronization protocol. The system includes a traceable time source that generates a traceable time value and a master node having a master clock that synchronizes a master time value to the traceable time value and that distributes the master time value to the slave clocks via the communication link. The nodes may be distributed nodes or cards connected to a backplane.

18 Claims, 8 Drawing Sheets

SYSTEM APPLICATION TECHNIQUES USING TIME SYNCHRONIZATION

BACKGROUND OF THE INVENTION

1. Field of Invention

The present invention pertains to the field of systems. More particularly, this invention relates to system application techniques using time synchronization technology.

2. Art Background

Distributed control systems are commonly arranged as a collection of nodes which are interconnected via one or more network communication links. These network communication links may be packetized links such as Ethernet or one or more of a variety of other packetized links that are adapted to distributed control system applications.

Distributed control systems commonly benefit from precise control of the timing at the distributed nodes. U.S. Pat. No. 5,566,180 of Eidson et. al. provides a method and apparatus for providing precise control of timing in distributed nodes by synchronizing the local clocks in the distributed nodes. In many applications, it may be desirable that the time kept by the distributed nodes be traceable to a standard time. Such may be useful in applications, for example, in which events in the distributed nodes must accurately occur with respect to a particular date and/or time of day.

SUMMARY OF THE INVENTION

A method and apparatus is disclosed for accurately distributing traceable time values to a set of nodes in a system. Each node includes a slave clock that synchronizes a slave time value using a synchronization protocol. The system includes a traceable time source that generates a traceable time value and a master node having a master clock that synchronizes a master time value to the traceable time value and that distributes the master time value to the slave clocks via the communication link. The nodes may be distributed nodes or cards connected to a backplane. Also disclosed are a variety of techniques for distributing the information associated with the synchronization protocol and a variety of applications for the synchronized timing in the slave nodes.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
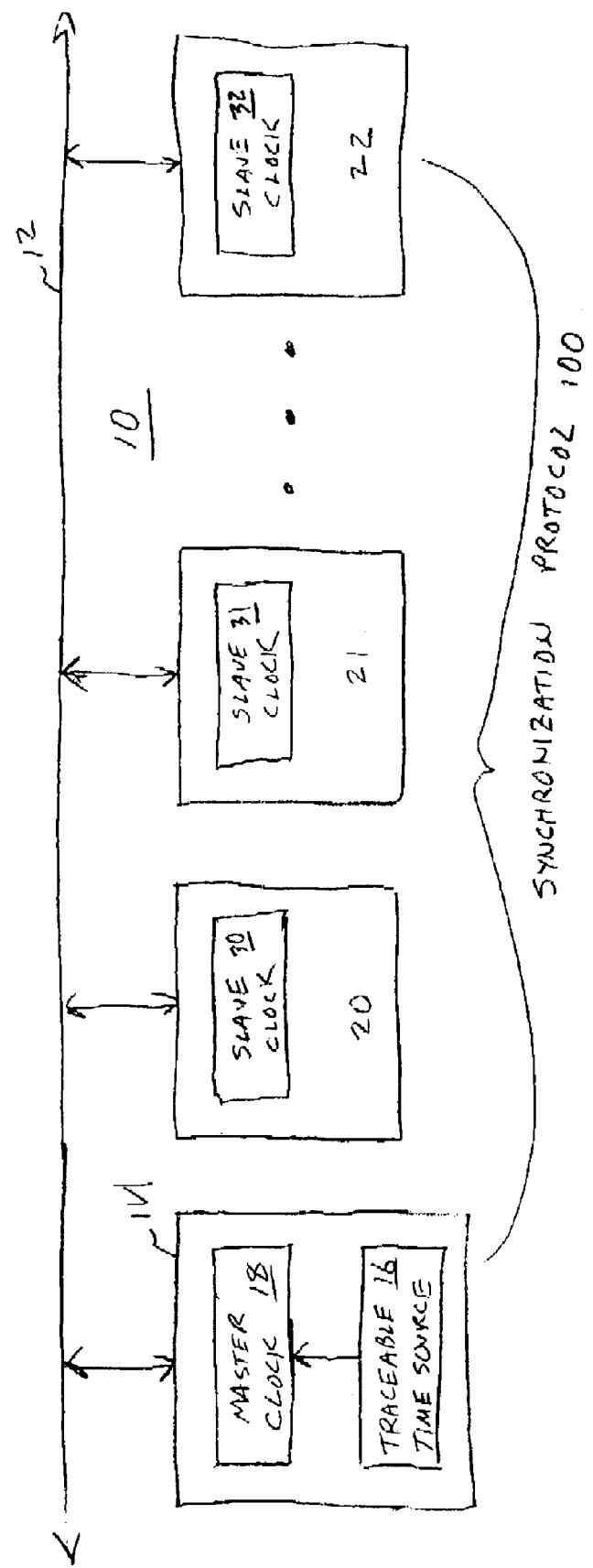
FIG. 1 shows a distributed system which includes a master node that distributes traceable time values to a set of nodes.

FIG. 1 shows a distributed system 10 which includes a master node 14 that distributes traceable time values to a set of nodes 20–22. The master node 14 and the nodes 20–22 are interconnected via a communication link 12. The master node 14 includes a master clock 18 and the nodes 20–22 include a set of slave clocks 30–32, respectively.

The master node 14 includes a traceable time source 16 that generates traceable time values. A traceable time value may be defined as a time value which is derived from a standard time such as UTC time which was formerly known as Greenwich Mean Time (GMT). The master clock 18 includes mechanisms that synchronize a master time value held in the master clock 18 to the traceable time values obtained from the traceable time source 16.

The master clock 18 and the slave clocks 30–32 implement a synchronization protocol 100. According to the synchronization protocol 100, the master clock 18 and the slave clocks 30–32 exchange packets via the communication link 12 so that the slave clocks 30–32 synchronize to the master time value held in the master clock 18. As a consequence, traceable time values are accurately distributed to the nodes 20–22 using the synchronization protocol 100 because the master time value in the master clock 18 is synchronized to the traceable time values from the traceable time source 16.

In one embodiment, the synchronization protocol 100 and related mechanisms implemented in the master clock 18 and the slave clocks 30–32 are those described in U.S. Pat. No. 5,566,180. For example, each of the slave clocks 30–32 may include circuitry for adjusting its respective locally stored time value based upon computations of the sending and receiving time of time data packets which are transferred over the communication link 12. The adjustment of a locally stored time value may be accomplished by implementing a local clock in each slave clock 30–32 as a counter driven by an oscillator with sufficient stability. The least significant few bits of the counter may be implemented as an adder so that the increment on oscillator periods may be occasionally increased or decreased to effectively speed up or slow down the local clock in accordance with the results of the computation.

In one embodiment, the traceable time source 16 is a global positioning system (GPS) receiver. In other embodiments, other types of traceable time sources may be used including radio broadcast time sources such as WWV or atomic clocks.

The master node 14 and the nodes 20–22 may be any type of node in the distributed system 10. For example, any one or more of the master node 14 and the nodes 20–22 may be a sensor node or an actuator node or an application controller node or a combination of these in a distributed control system. Any one or more of the master node 14 and the nodes 20–22 may be a computer system such as a personal computer.

The communication link 12 may be implemented with one or more of a variety of communication mechanisms. In one embodiment, the communication link 12 is an Ethernet communication network. In another embodiment, the communication link 12 is a LonTalk field-level control bus which is specialized for the process control environment. In other embodiments, the communication link 12 may be implemented with time division multiple access (TDMA) or token ring protocols to name only a few possibilities.

The synchronization protocol 100, with or without traceable time, may be used to provide periodic phase coherent signals at widely dispersed points which correspond to the physical locations of the nodes 20–22. For example, each of the nodes 20–22 may implement a schedule of times marking desired signal events. Each node 20–22 compares these scheduled times to the local times provided by the corresponding slave clocks 30–32. When a scheduled event time matches the local time with appropriate accuracy, then a scheduled event is generated. The scheduled events may be sampling events wherein the nodes 20–22 include attached sensors. The nodes 20–22 may include waveform generators if analog signals are needed for events. In such a case, a match between local time and a time of a scheduled event triggers a waveform generator.

Figure 2:
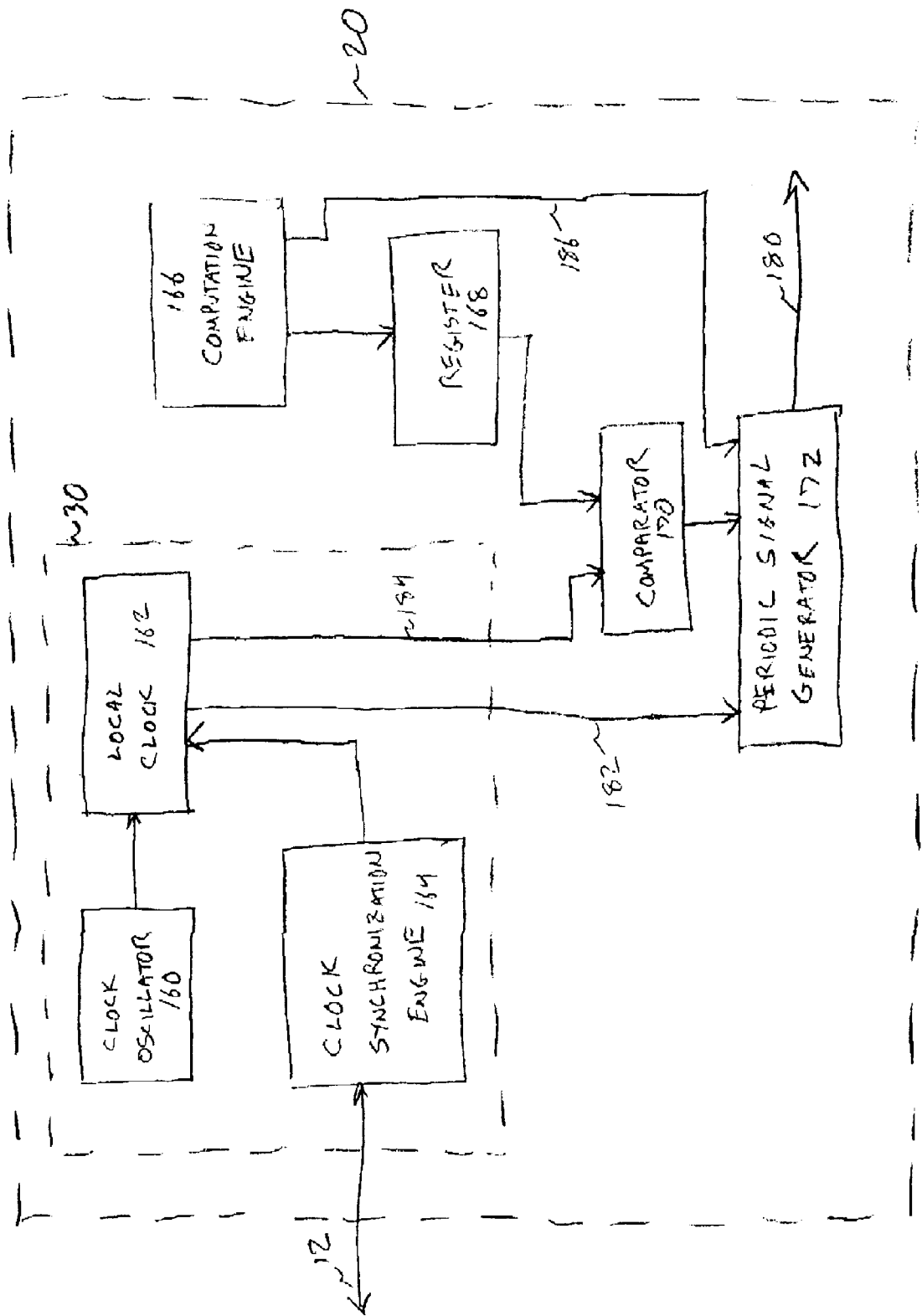
FIG. 2 illustrates a node with a waveform generator that derives a waveform period from the counter in a slave clock.

FIG. 2 illustrates the node 20 with a waveform generator that derives a waveform period from the counter in the slave clock 30. The slave clock 30 includes a clock oscillator 160, a local clock 162, and a clock synchronization engine 164. The clock synchronization engine 164 obtains timing data packets from the communication link 12 and synchronizes a slave time value in the local clock 162 using the synchronization protocol 100. The local clock 162 provides a slave time value 184 to a comparator 170. The comparator 170 compares the slave time value 184 to an event time held in a register 168. The event time is provided by a computation engine 166. When the slave time value 184 matches the event time in the register 168 the comparator 170 triggers a periodic signal generator 172 which generates a waveform 180.

The period of the waveform 180 is controlled by a set of signals 182 from the local clock 162. The local clock 162 includes a counter portion and a clock adjustment portion. It is preferable that the signals 182 provide bits of the counter portion of the local clock 162 which are more significant than the lower order bits of the local clock 162 used for the clock adjustment portion. The periodic signal generator 172 may be implemented using a digital phase locked loop which is driven by the signal 182, or using other well know techniques.

The synchronization protocol 100, with or without traceable time, may be used to provide the basis for time division multiplex access (TDMA) communication or other temporal mutual exclusion communication protocols among the master node 14 and the nodes 20–22. The master node 14 and each node 20–22 may be allocated time slots the boundaries of which provide event triggers for TDMA communication. The event triggering techniques described above may be use to trigger time slot communication on the communication link 12 in each of the master node 14 and the nodes 20–22.

The synchronization protocol 100, with or without traceable time, may be used to provide an accurate time base for data acquisition and control in the system 10. The techniques disclosed above for providing phase coherent signals in the master nodes 14 and nodes 20–22 enables the establishment of a periodic time base for data acquisition and control. The generation of these phase coherent signal may be used to form the basis for a class of supervisory control and data acquisition (SCADA) systems.

The techniques disclosed above for providing phase coherent signals enables the timing function to be distributed to the actual measurement or control nodes. This provides for improved accuracy, robustness and flexibility. As an example of flexibility, different portions of a SCADA system using the techniques disclosed herein may be configured to run at different periodic or scheduled frequencies without any conflict of resources. This is in contrast to prior centralized systems in which the management of two or more processes with different periodicity in general produces resource contention in the applications. This can cause timing jitter in the controlled processes.

A distributed system which generates "time ticks" using present techniques for providing phase coherent signals is more accurate than prior systems. In addition, such a system is more robust in that the synchronization protocol 100 tends to keep the local clocks in sync even in the face of lost timing data packets. Moreover, the synchronization protocol 100 consumes minimal amounts of network bandwidth in comparison to prior systems.

Figure 3:
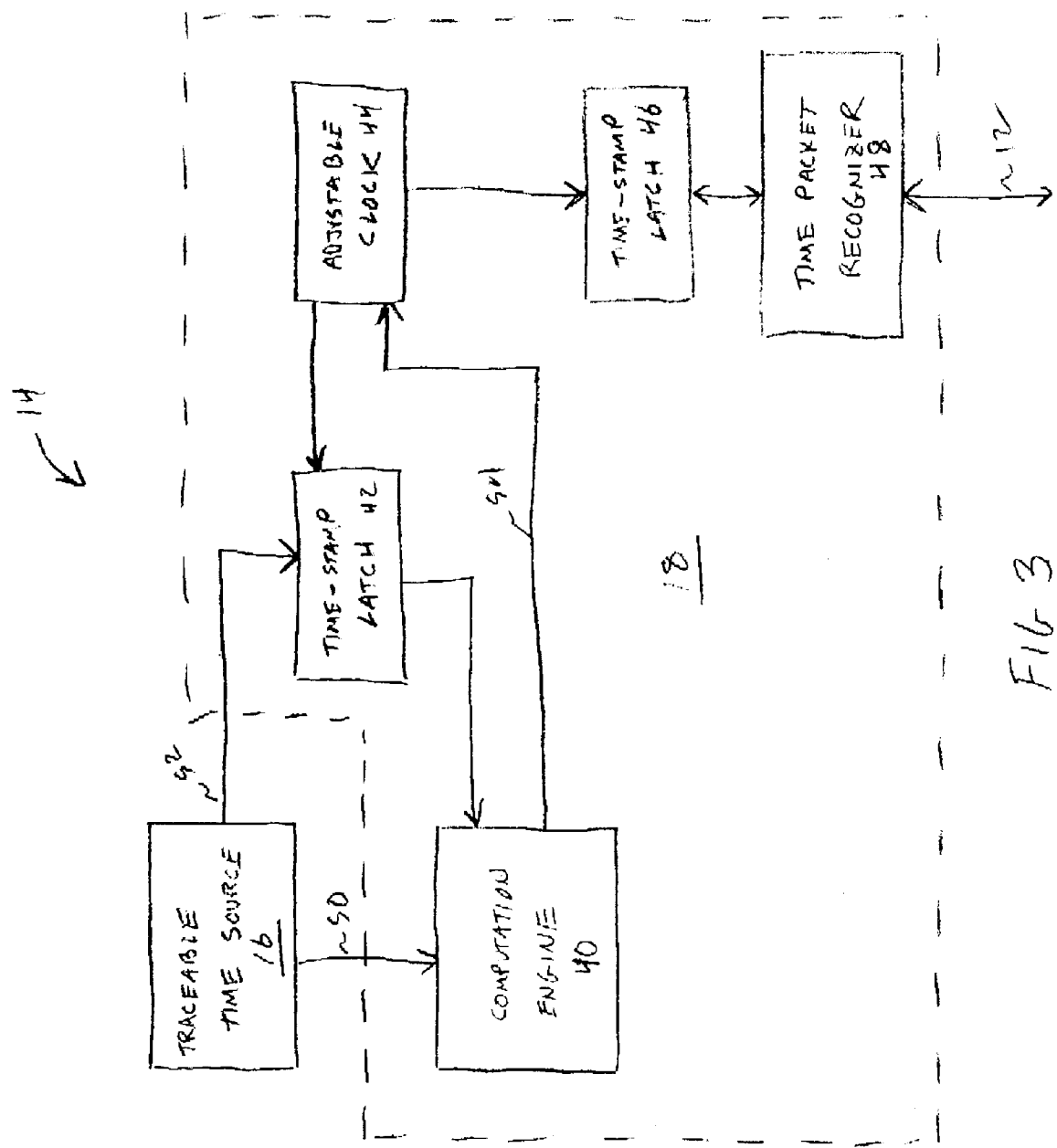
FIG. 3 illustrates a master clock with traceable time in one embodiment.

FIG. 3 illustrates the master clock 18 in one embodiment. The master clock 18 includes a computation engine 40, a time-stamp latch 42, an adjustable clock 44, at time-stamp latch 46, and a time packet recognizer 48. The arrangement shown causes the time value in the adjustable clock 44 to be controlled by the traceable time source 16 and causes the time values held in the slave clocks 30–32 to be controlled by the time value in the adjustable clock 44.

The traceable time source 16 generates an updated traceable time value 50 and a series of pulses 52 which in one embodiment occur once per second. The pulses 52 continuously cause the time-stamp latch 42 to latch time values from the adjustable clock 44. The computation engine 40 compares the updated traceable time value 50 to the time values from the time-stamp latch 42 and issues a set of clock adjustment signals 54 that cause the adjustable clock 44 to move toward and eventually match the updated traceable time value 50.

The computation engine 40 issues the clock adjustment signals 54 to cause the adjustable clock 44 to either speed up or slow down or maintain rate or reload with a new time value. In one embodiment, the adjustable clock 44 is implemented as a counter driven by an oscillator with an adder that adds either 0, 1, or 2 to the counter during each period of the oscillator. If the time value held in the time-stamp latch 42 is less than the updated traceable time value 50 then the computation engine 40 issues the clock adjustment signals 54 to cause a 2 to be added to the counter of the adjustable clock 44. If the time value held in the time-stamp latch 42 equals the updated traceable time value 50 then the computation engine 40 issues the clock adjustment signals 54 to cause a 1 to be added to the counter of the adjustable clock 44. If the time value held in the time-stamp latch 42 is greater than the updated traceable time value 50 then the computation engine 40 issues the clock adjustment signals 54 to cause a 0 to be added to the counter of the adjustable clock 44. If the difference between the time value held in the time-stamp latch 42 and the updated traceable time value 50 is greater than a predetermined value then the computation engine 40 uses the clock adjustment signal 54 to reload the adjustable clock 44.

The time-stamp latch 46 obtains time values from the adjustable clock 44. The time packet recognizer 48 in response generates time data packets and transfers them via the communication link 12 to cause the slave clocks 30–32 to synchronize to the time value held in the time-stamp latch 46. This is in accordance with the synchronization protocol 100.

Figure 4:
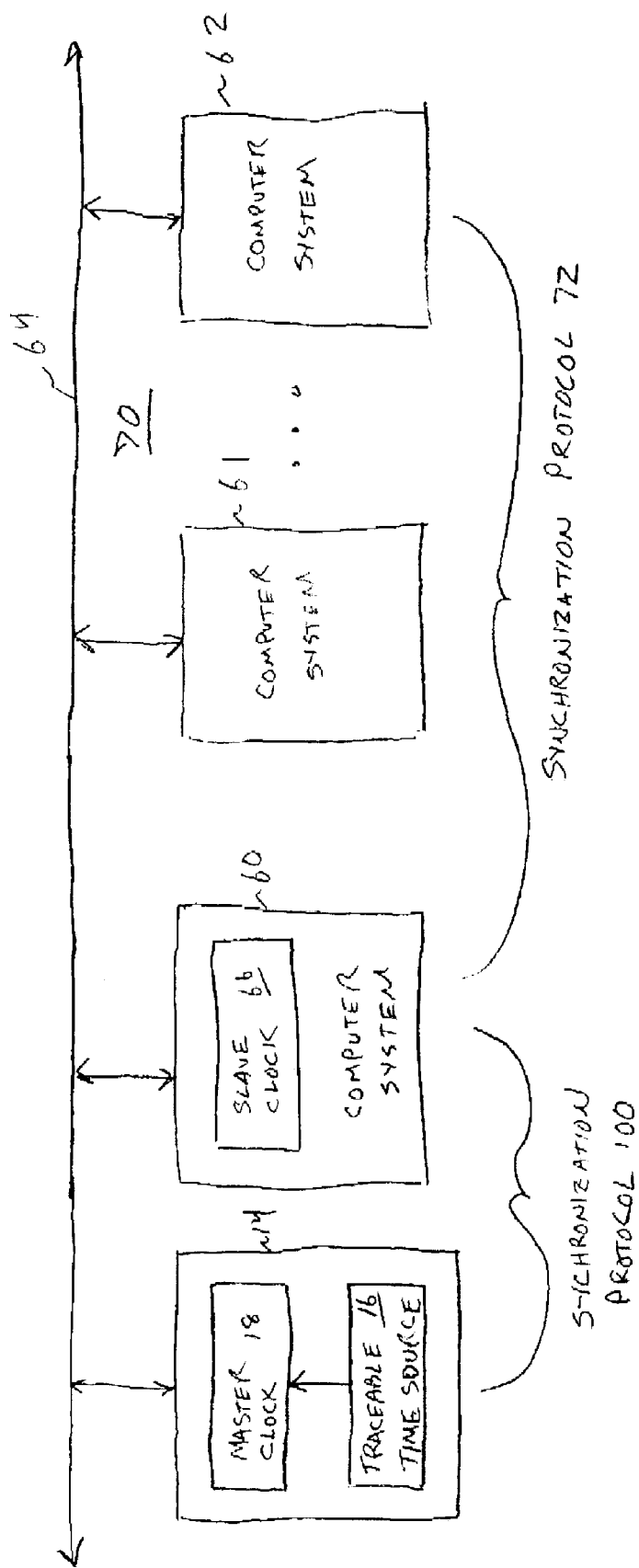
FIG. 4 illustrates a technique for introducing traceable time into a system which includes a set of computer systems.

FIG. 4 illustrates a technique for introducing traceable time into a system 70 which includes a set of computer systems 60–62 that participate in a synchronization protocol 72 which differs from the synchronization protocol 100. In one embodiment, the synchronization protocol 72 implemented by the computer systems 60–62 is the network time protocol (NTP).

The computer systems 60–62 may be personal computers or workstations or a combination of these. In accordance with NTP, the computer systems 60–62 periodically exchange messages containing the local system clock time via a communication link 64. In response, each computer system 60–62 adjusts its system clock. Eventually, the system clocks in the computer systems 60–62 converge.

The computer system 60 not only implements the NTP protocol, but also includes a slave clock 66 which synchronizes to the traceable time values distributed by the master clock 18 using the synchronization protocol 100. The software layers of the NTP protocol in the computer system 60 obtain time values from the slave clock 66 rather than the system clock of the computer system 60. In addition, the slave clock 66 remains synchronized to the master clock 18 rather than converging with the NTP protocol as do the system clocks of the computer systems 61–62. As a result, the system clocks of the computer systems 61–62 eventually converge to the time value in the slave clock 66 which is traceable time.

The slave clock 66 may be implemented on a standardized interface card for the computer system 60. The same interface card may contain both the slave clock 66 and the elements needed for communication on the communication link 64. For example, one interface card may contain the slave clock 66 and an Ethernet interface if the communication link 64 is Ethernet.

In one embodiment, the master node 14 is a computer system such as a personal computer or workstation. In such an embodiment, the host processor of the master node 14 may perform the functions associated with the computation engine 40.

Figure 5:
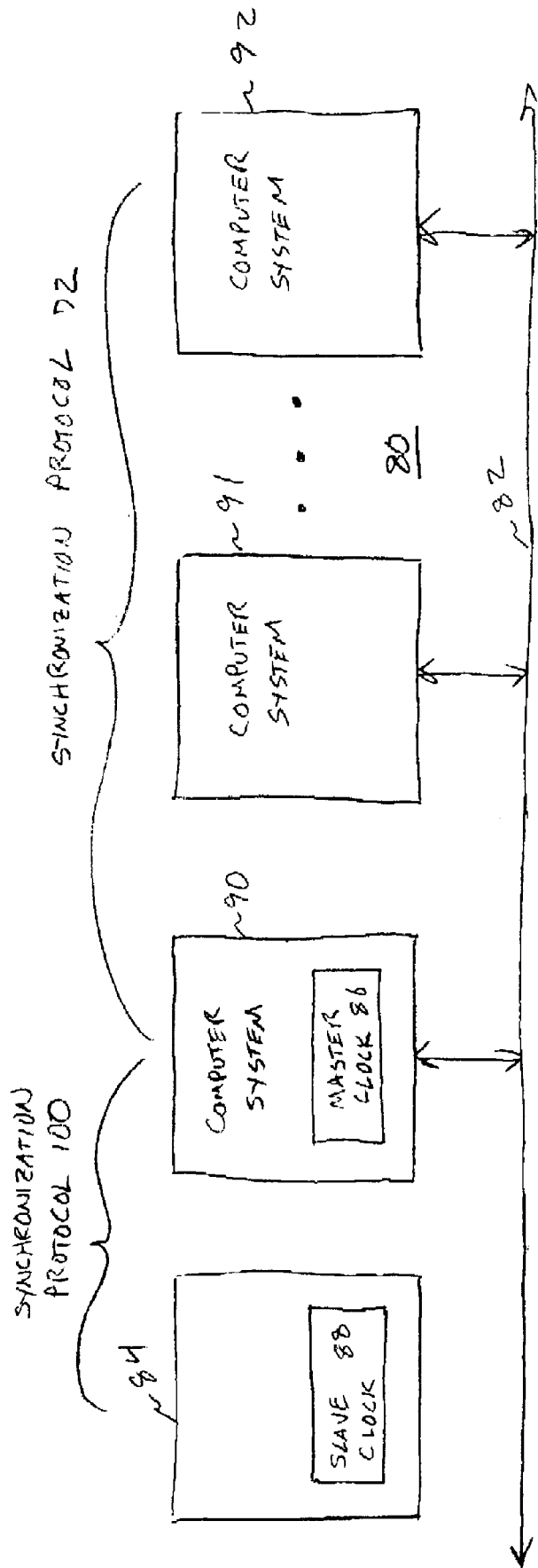
FIG. 5 illustrates a technique for using one synchronization protocol to distribute the time values provided by a different synchronization protocol.

FIG. 5 illustrates a technique for using the synchronization protocol 100 to distribute the time values obtained with the synchronization protocol 72. A system 80 is shown including a set of computer systems 90–92 that participate in the synchronization protocol 72 which may be NTP via a communication link 82. The computer system 90 includes a master clock 86 which participates in the synchronization protocol 100 via the communication link 82 with a node 84 having a slave clock 88. The computer system 90 obtains a time value from its system clock and provides it to the master clock 86. The master clock 86 distributes this time value to the slave clock 88 using the synchronization protocol 100.

The master clock 86 may be implemented on a standardized interface card for the computer system 90. The same interface card may contain both the master clock 86 and the elements needed for communication on the communication link 82. The host processor of the computer system 90 may perform the functions associated with the computation engine of the master clock 86. Alternatively, the master clock 86 may contain a computation engine which obtains system time values from the host processor of the computer system 90.

Figure 6:
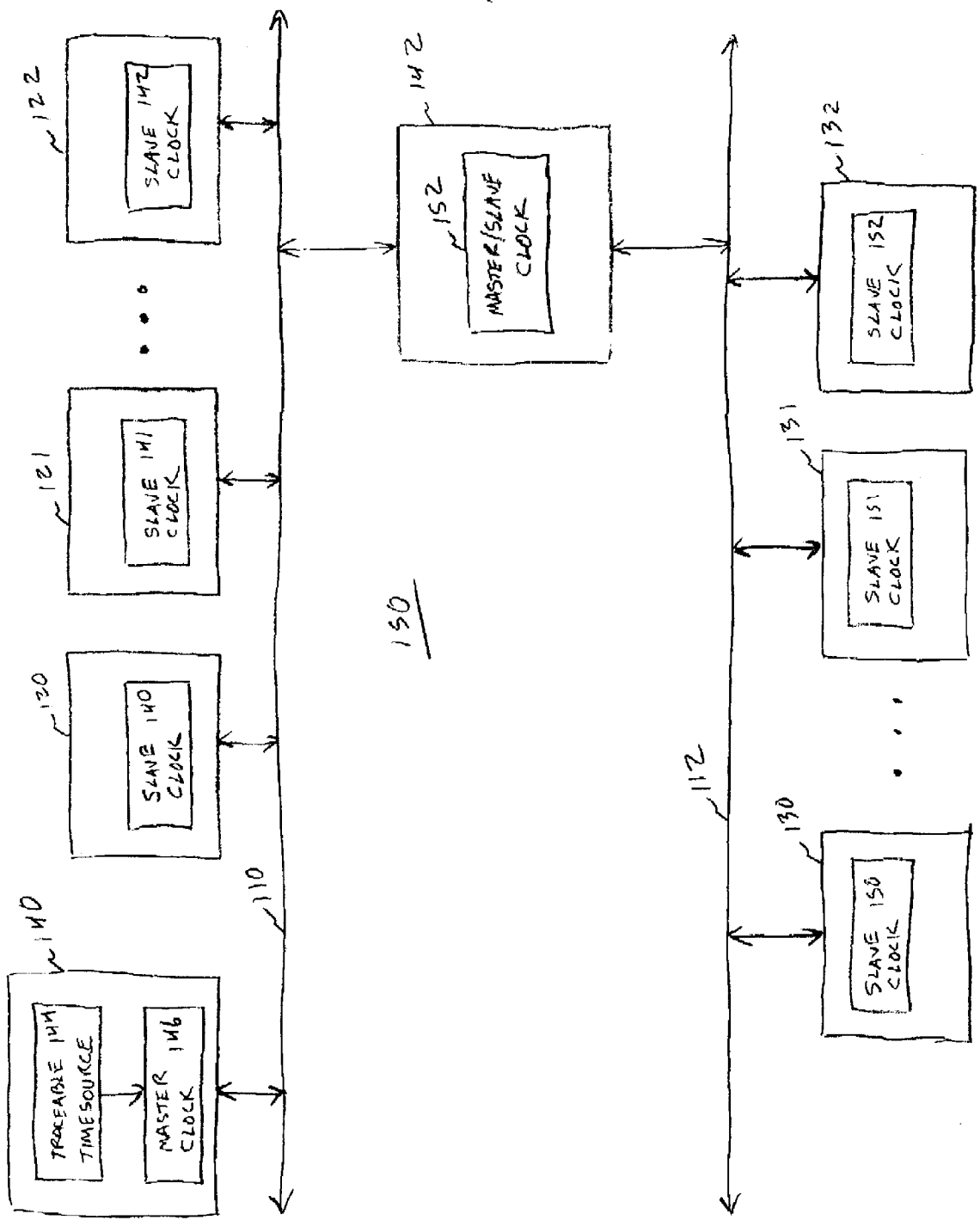
FIG. 6 shows a technique for distributing traceable time values to nodes which are connected to different sub-nets of a system.

FIG. 6 shows a technique for distributing traceable time values to nodes which are connected to different sub-nets of a system 150. One sub-net of the system 150 includes a set of nodes 120–122 coupled to a communication link 110 and another sub-net of the system 150 includes a set of nodes 130–132 coupled to a communication link 112.

Traceable time values are introduced into the system 150 using a master node 140 which includes a traceable time source 144 and a master clock 146. The traceable time source 144 provides traceable time values to the master clock 146 and the master clock 146 distributes the traceable time values to a set of slave clocks 140–142 in the nodes 120–122 using the synchronization protocol 100.

The system 150 includes a boundary node 142 coupled between the communication links 110–112. The boundary node 142 includes a master/slave clock 152. The master/slave clock 152 behaves like a slave clock in that it synchronizes to traceable time values distributed by the master clock 146 via the communication link 110. In addition, the master/slave clock 152 behaves like a master clock in that it in turn distributes the traceable time values to a set of slave clocks 150–152 in the nodes 130–132 via the communication link 112.

Figure 7:
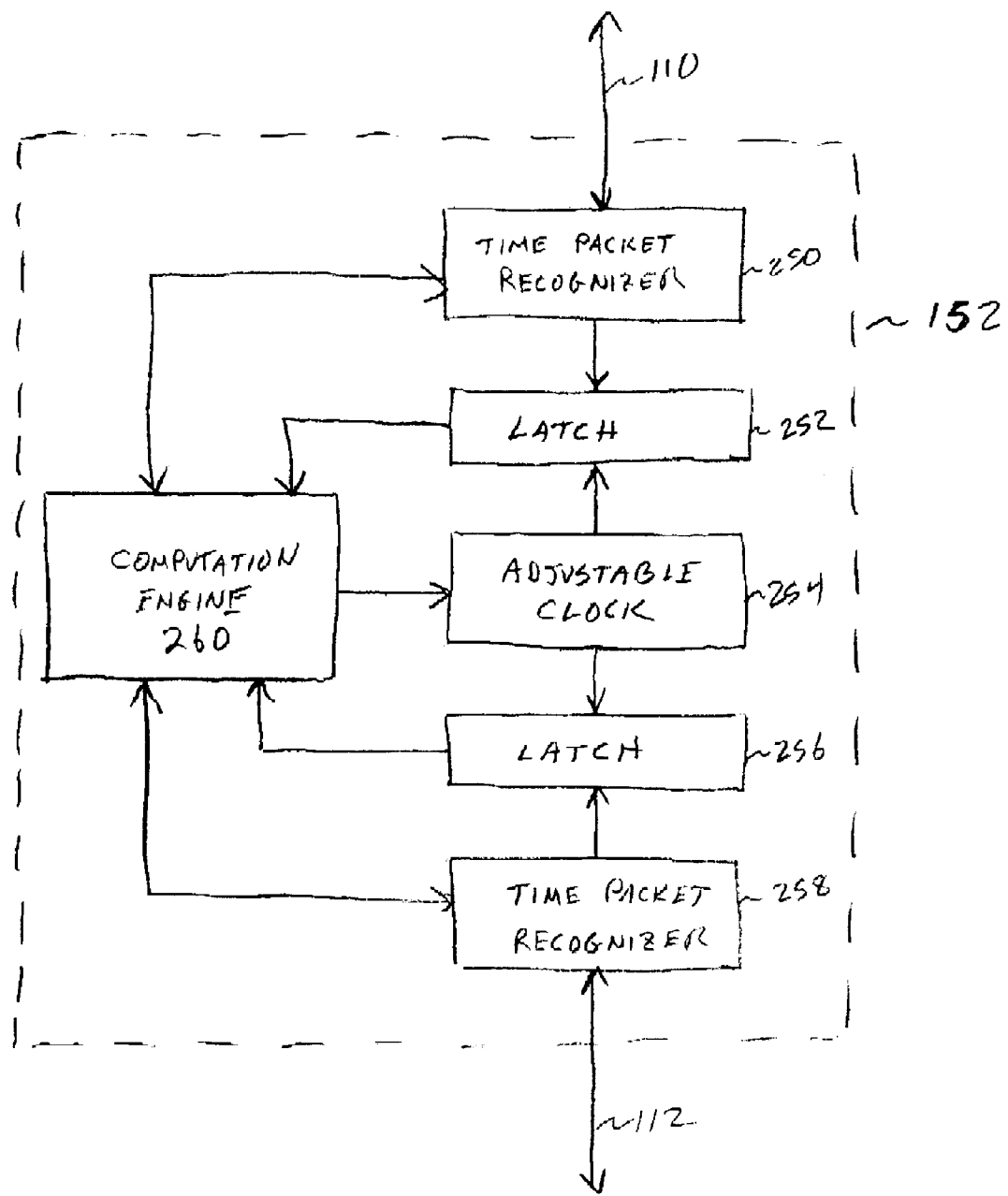
FIG. 7 illustrates one embodiment of a master/slave clock in a boundary node.

FIG. 7 illustrates one embodiment of the master/slave clock 152. The master/slave clock 152 includes an adjustable clock 254 along with a time packet recognizer 250 and a latch 252 for the slave side on the communication link 110 and a time packet recognizer 258 and a latch 256 for the master side on the communication link 112. A computation engine 260 performs the computations for both the master and slave sides of the master/slave clock 152.

The operation of the slave side of the master/slave clock 152 is as follows. The master clock 146 transfers a timing data packet (a timing event) via the communication link 110 and then transfers a data packet containing a traceable time value for the timing event (the supplemental information for the timing event) via the communication link 110. In response to the timing event, the time packet recognizer 250 causes the latch 252 to latch the local time in the adjustable clock 254. The computation engine 260 receives the supplemental information and computes the difference between the time value in the latch 252 and the traceable time value from the supplemental information and then adjusts the adjustable clock 254 accordingly. This causes the adjustable clock 254 to sync to the traceable time values distributed by the master clock 146.

The operation of the master side of the master/slave clock 152 is as follows. The computation engine 260 periodically generates a timing data packet and transfers it via the communication link 112 to the slave clocks 150–152. In response to a timing data packet, the time packet recognizer 258 causes the latch 256 to latch the local time in the adjustable clock 254. The computation engine 260 then obtains the latched time value from the latch 256 and transfers it as supplemental information via the communication link 112 to the slave clocks 150–152. This enables the computation engines in the slave clocks 150–152 to sync up to traceable time values of the adjustable clock 254. For example, the slave clock 150 uses the difference between its reception time of a timing data packet and the traceable time value provided by the corresponding supplemental information to adjust its local adjustable clock.

The computation engine 260 may render a determination of which is the master side and which is the slave side of the master/slave clock 152 in response to information provided by the clocks attached to each communication link 110–112. This information may include the accuracy of the clocks, whether a clock provides traceable time values either directly or as a slave to a traceable time source, and whether clocks are themselves two-sided clocks of a boundary node.

A master/slave clock in a boundary node in general has one slave side and n master sides for linking up to n additional subnets. Each slave side and each of the n master sides have corresponding time packet recognizers and latches and the same computation engine may be shared among them. The slave side is a slave on the subnet which has the best source of time according to a preselected criteria such as accuracy or any of the other criteria set forth above.

Figure 8:
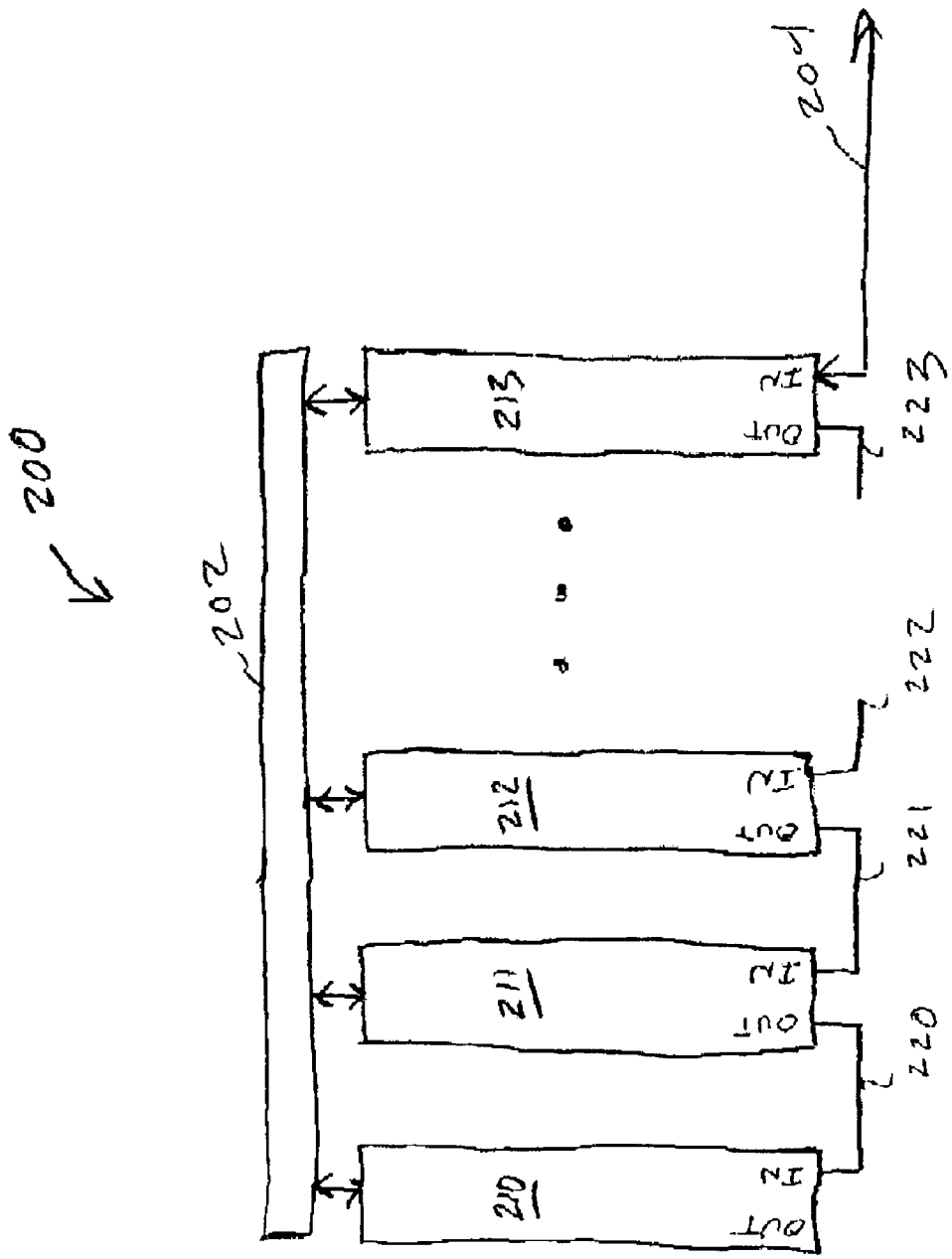
FIG. 8 illustrates clock synchronization in a data acquisition and control system which includes a set of cards connected to a backplane.

FIG. 8 shows a data acquisition and control system 200 which includes a set of cards 210–213 connected to a backplane 202. The cards 210–213 each include circuitry for providing synchronized clocks using the synchronization protocol 100 and include circuitry for generating phase coherent signals using techniques outline above.

The synchronization protocol 100 requires that two basic types of information be communicated among the cards 210–213. The basic types are a timing event and a set of supplementary information associated with the timing event. For example, a timing data packet is a timing event. If a traceable time is provided by a GPS source then the timing data packets usually occur at one per second.

The supplemental information for a timing event is an interpretation of the timing event. For example, if a timing event is associated with a GPS source then the supplemental information for the timing event is the UTC time at which the timing event was generated. If a timing event is associated with a master clock then the supplemental information for the timing event is the time at which the node having the master clock generated the timing event.

The cards 210–213 communicate timing events using a set of communication links 220–223 arranged as a daisy chain. Each of the cards 210–213 includes a daisy chain input port (IN) and a daisy chain output port (OUT). Each of the cards 210–213 receives timing events on its IN port and issues timing events on its OUT port. If a card does not detect any timing events on its IN port then it can assume that it is the master of the data acquisition and control system 200. Alternatively, the master of the data acquisition and control system 200 may be configured by a host processor connected to the backplane 202. The one of the cards 210–213 that is master issues timing events at an appropriate rate. Each of the remaining ones of the cards 210–213 that is a slave card passes each timing event from its IN port to its OUT port without significant delay.

In one embodiment, the communication links 220–223 are signal lines. In another embodiment, the communication links 220–223 are fiber optic links. The cards 210–223 may include LEDs and photo-diodes so that when each card 210–223 is inserted in the backplane 202 a daisy chain input and output link is formed. In other embodiments, the communication links 220–223 may be RS232 links or network communication links such as Ethernet.

The one of the cards 210–213 having the master clock generates the supplemental information and may be referred to as the master card. The remainder of the cards 210–213 receive the supplemental information and may be referred to as slave cards. In one embodiment, the cards 210–213 communicate the supplemental information using communication paths on the backplane 202 since the supplemental information is less time critical than the timing events and therefore the delays associated with communication on the backplane 202 may be tolerable. This embodiment allows simple and low cost implementations of the communication links 220–223. For example, the communication links 220–223 may be signal lines that carry CMOS signals which communication timing events.

In an alternative embodiment, the cards 210–213 communicate the supplemental information using the communication links 220–223. This embodiment may require that the communication links 220–223 be implemented in a somewhat more complex manner. For example, information may be carried on the communication links 220–223 using a signal packet. A start of frame portion of the signal packet may indicate the timing event and the supplemental information may be encoded in the remainder of the signal packet. Another option is an RS232 implementation of the communication links 220–223.

In one embodiment, the card 213 is the master card which includes a master clock that distributes time values to slave clocks in the cards 210–212 and to slave clocks in nodes that are connected to a communication link 204. These time values may be obtained from a host processor connected to the backplane 202 which implements the NTP protocol.

In another embodiment, the card 213 includes a master clock that distributes time values to slave clocks in the cards 210–212 and includes a slave clock that synchronizes to a master clock in a node connected to the communication link 204. The node connected to the communication link 204 and having the master clock may include a traceable time source such as GPS as described above. The communication link 204 may be a network communication link 204 such as Ethernet. The card 213 may also serve as a port to the communication link 204 for a host processor connected to the backplane 202.

The computations needed for the synchronization protocol 100 may be performed by computation circuitry implemented on the cards 210–213. Alternatively, the computations needed for the synchronization protocol 100 may be performed by a host processor connected to the backplane 202.

The backplane 202 may be that of a personal computer or workstation or a specialized system. The backplane 202 may be a standard backplane such as PCI, VME, or ISA to name a few examples.

A communication link for communicating the timing events and the supplemental information for the synchronization protocol 100 may be implemented as an additional trace on the backplane 202. However, this may require a modification to an existing backplane standard which may not be practical. In addition the communication link for communicating the timing events and the supplemental information may be a packetized network such as Ethernet which is connected to each of the cards 210–213. This may be too expensive to implement for a backplane system.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system, comprising:
 a set of nodes coupled to a communication link and each having a slave clock that synchronizes a slave time value using a synchronization protocol;
 traceable time source that generates a traceable time value;
 master node coupled to the communication link and having a master clock that synchronizes a master time value to the traceable time value and that distributes the master time value to the slave clocks via the communication link using the synchronization protocol.

2. The system of claim 1, wherein the traceable time source is contained in the master node.

3. The system of claim 1, wherein the traceable time source is a GPS receiver.

4. The system of claim 1, further comprising a computer system coupled to the communication link and having a slave clock which synchronizes to the master time value via the communication link using the synchronization protocol, the computer system executing a set of software for synchronizing a system clock of the computer system to a set of other system clocks in a set of other computer systems coupled to the communication link such that the computer system substitutes a time value from the slave clock for a time value in the system clock for use in synchronizing the other system clocks in the other computer systems.

5. The system of claim 4, wherein the communication link enables communication using a packetized network communication protocol.

6. The system of claim 5, wherein the slave clock of the computer system and circuitry for the packetized network communication protocol are both implemented on an interface card for the computer system.

7. A system, comprising:
   a set of nodes coupled to a communication link and each having a slave clock that synchronizes a slave time value using a synchronization protocol;
   computer system coupled to the communication link and executing a set of software for synchronizing a system clock of the computer system to a set of other system clocks in a set of other computer systems coupled to the communication link, the computer system having a master clock that synchronizes a master time value to the system clock and that distributes the master time value to the slave clocks via the communication link using the synchronization protocol.

8. The system of claim 7, wherein the communication link enables communication using a packetized network communication protocol.

9. The system of claim 8, wherein the master clock and circuitry for the packetized network communication protocol are implemented on an interface card for the computer system.

10. A system, comprising:
    first sub-net having a set of first nodes coupled to a first communication link, each first node having a slave clock that synchronizes a slave time value using a synchronization protocol on the first communication link;
    second sub-net having a set of second nodes coupled to a second communication link, each second node having a slave clock that synchronizes a slave time value using the synchronization protocol on the second communication link;
    traceable time source that generates a traceable time value;
    master node coupled to the first communication link and having a master clock that synchronizes a master time value to the traceable time value and that distributes the master time value to the slave clocks via the first communication link using the synchronization protocol;
    boundary node coupled to the first communication link and having a master/slave clock that synchronizes to the master time value distributed by the master clock using the synchronization protocol on the first communication link and that distributes the master time value to the slave clocks of the second sub-net via the second communication link using the synchronization protocol.

11. The system of claim 10, wherein the traceable time source is contained in the master node.

12. The system of claim 10, wherein the traceable time source is a GPS receiver.

13. A system, comprising:
    master node coupled to a communication link and having a master clock that distributes a master time value via the communication link using a synchronization protocol;
    a set of nodes coupled to the communication link and each having a slave clock that synchronizes a slave time value to the master time value using the synchronization protocol, wherein one or more of the nodes includes circuitry for generating a phase coherent periodic signal in response to the slave time value.

14. The system of claim 13, wherein the phase coherent periodic signal is used for synchronizing TDMA communication on the communication link.

15. The system of claim 13, wherein the phase coherent periodic signal is used for a time base in data acquisition and control.

16. The system of claim 13, further comprising a traceable time source that generates a traceable time value such that the master clock synchronizes the master time value to the traceable time value.

17. A data acquisition and control system, comprising:
    a set of slave cards connected to a backplane, each slave card having a slave clock for use with a synchronization protocol which includes at least one timing event and a set of supplemental information associated with the timing event;
    master card connected to the backplane and having a master clock for use with the synchronization protocol;
    daisy chain communication link among the master card and the slave cards such that the master card communicates the timing event to the slave cards using the daisy chain communication link and communicates the supplemental information to the slave cards using a communication path on the backplane.

18. The data acquisition and control system of claim 17, wherein the master card is coupled to a network communication link which is connected to one or more nodes each of which includes a slave clock such that the master clock in the master card distributes the timing event and the supplemental information to the nodes via the network communication link.

* * * * *